United States Patent
Bambrough

[11] Patent Number: 5,566,780
[45] Date of Patent: Oct. 22, 1996

[54] LADDER-BASED CART APPARATUS

[76] Inventor: Harry M. Bambrough, 925 Hillcrest La., Oregon, Wis. 53575

[21] Appl. No.: 443,731
[22] Filed: May 18, 1995
[51] Int. Cl.⁶ .................................................. A01M 31/02
[52] U.S. Cl. .............................................. 182/116; 182/20
[58] Field of Search ................................ 182/116, 187, 182/20

[56] References Cited

U.S. PATENT DOCUMENTS

| | | | |
|---|---|---|---|
| 441,872 | 12/1890 | Harvey | 182/180 X |
| 3,857,460 | 12/1974 | Nini. | |
| 4,045,040 | 8/1977 | Fails | 182/20 X |
| 4,614,252 | 9/1986 | Tarner | 182/116 |
| 4,660,794 | 4/1987 | Given | 248/238 |
| 4,991,690 | 2/1991 | Woller. | |
| 5,080,193 | 1/1992 | Woof. | |
| 5,082,086 | 1/1992 | Kerr. | |
| 5,105,908 | 4/1992 | Freund | 182/116 X |
| 5,242,030 | 9/1993 | Lobozzo | 182/116 X |
| 5,295,556 | 3/1994 | Mullin. | |
| 5,314,042 | 5/1994 | Adams | 182/116 X |

Primary Examiner—Alvin C. Chin-Shue

[57] ABSTRACT

A ladder-based cart apparatus includes a first ladder assembly and a second ladder assembly. A pair of wheel assemblies are supported by first ladder assembly at preselected positions along the first ladder assembly. Adjustable connection assemblies connect the wheel assemblies to the preselected positions along the first ladder assembly. Each connection assembly has a height which is less than respective widths of first lateral support members of the first ladder assembly so that translation of the second ladder assembly with respect to the first ladder assembly is not interfered with by the connection assembly. A first platform assembly, connected to distal ends of second lateral support members of the second ladder assembly, includes a hinge assembly connected to the distal ends of the second lateral support members. A first platform element is connected to the hinge assembly. A stop element is connected to a bottom side of the first platform element. The stop element includes a fixed portion connected to the first platform element and a free-end portion projecting from the fixed portion at a predetermined obtuse angle. A strap assembly is connected to the first platform element for connecting the apparatus to a tree. A lock assembly is connected to each of the second lateral support members, for securing the stop elements when the first platform element is in a horizontal orientation. In addition, a folding, cable-supported, horizontally orientable, second platform assembly can be connected to the second ladder assembly.

8 Claims, 4 Drawing Sheets

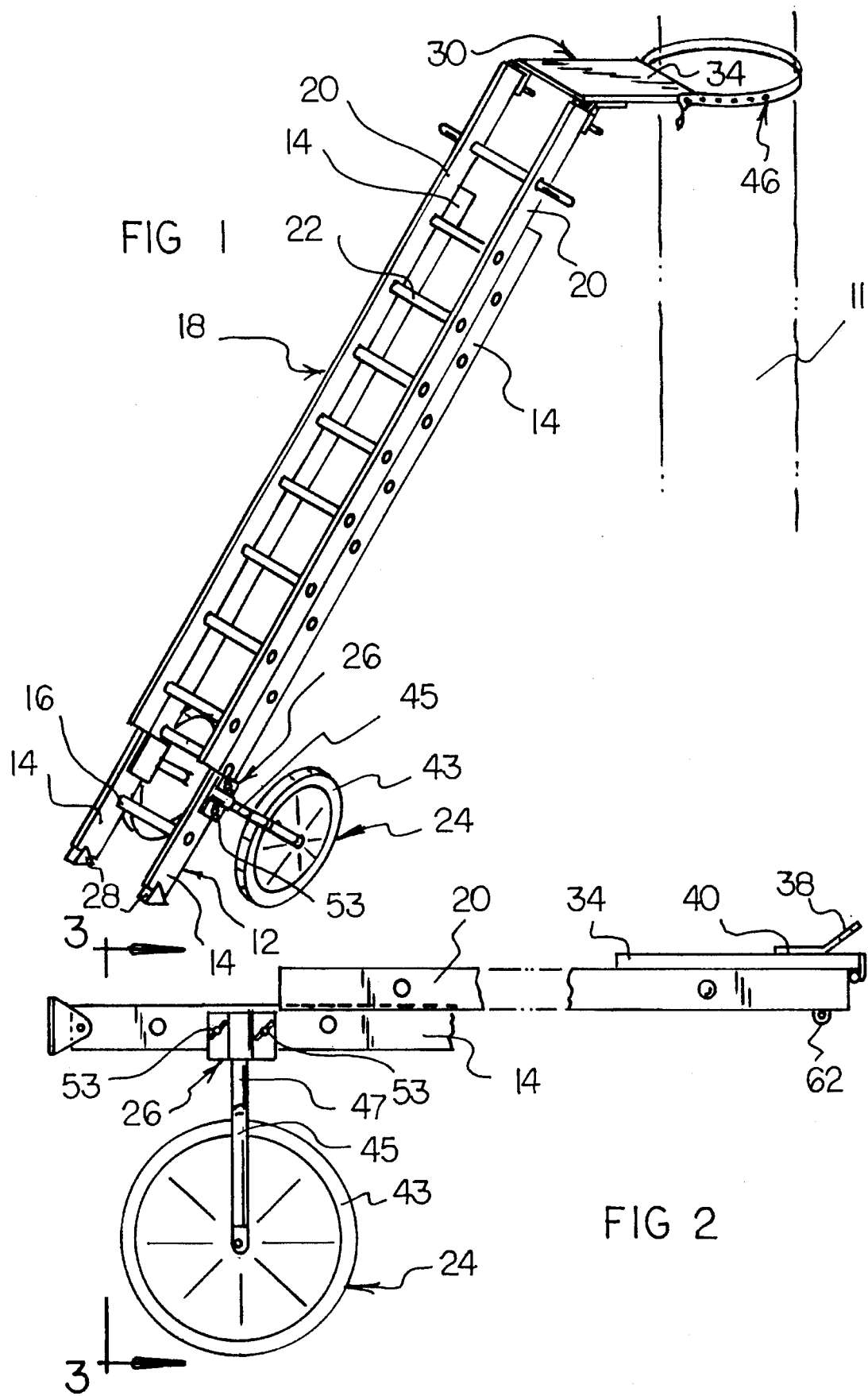

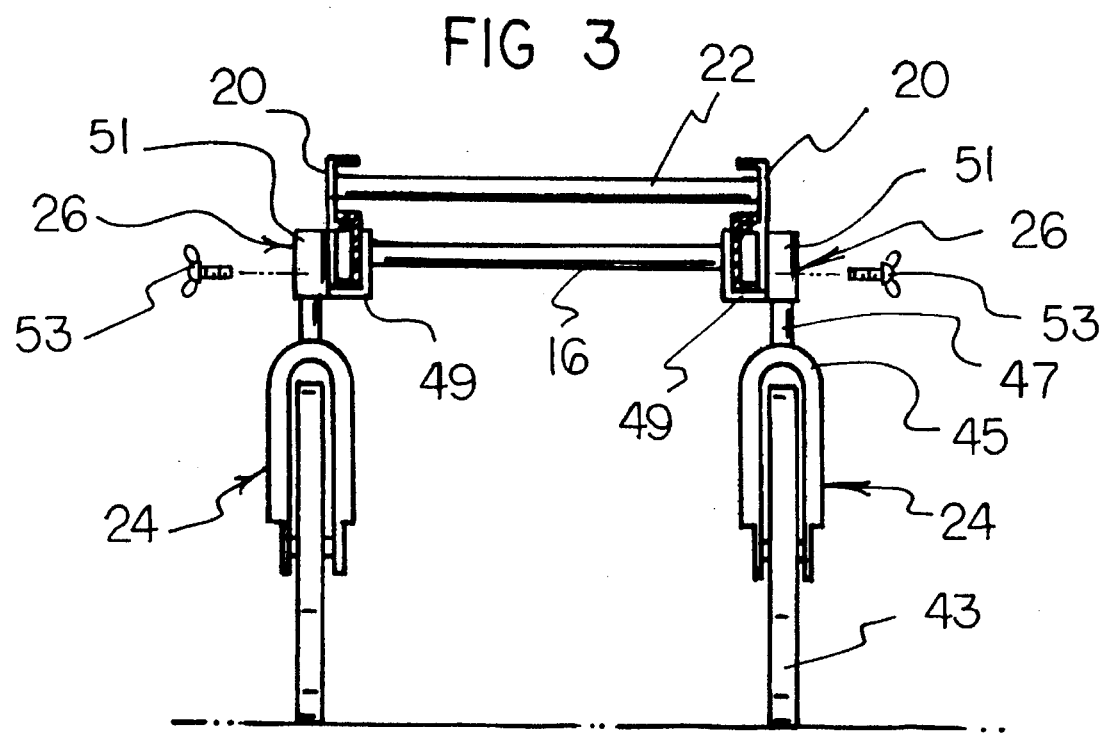

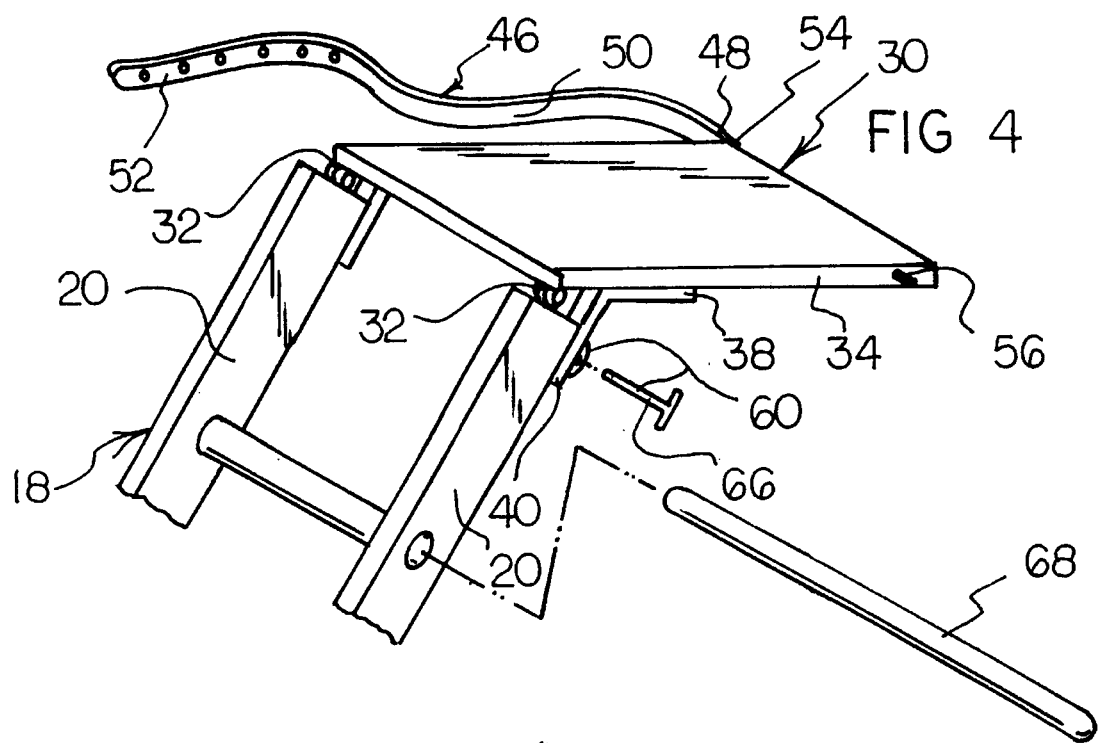
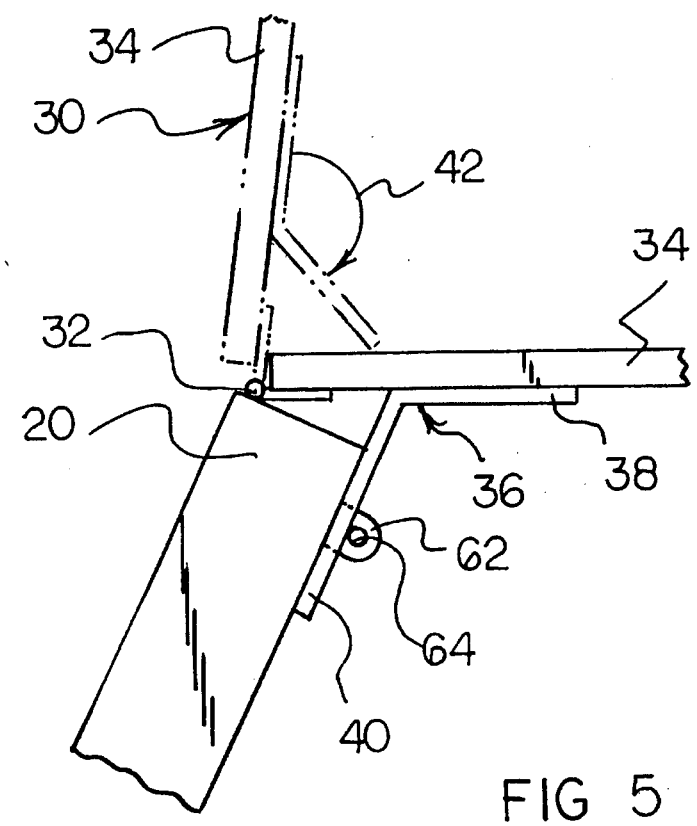

LADDER-BASED CART APPARATUS

BACKGROUND OF THE INVENTION

1. Field of the Invention

The present invention relates generally to wheeled carts and, more particularly, to wheeled carts having a ladder function.

2. Description of the Prior Art

Generally, carts are wheeled structures that are used for transporting loads. Also, generally, ladders are structures that can be climbed to enable a person to change the elevation of one's position. Throughout the years, a number of innovations have been developed relating to combined carts and ladders, and the following U.S. Pat. Nos. are representative of some of those innovations: 3,857,460; 5,082,086; 5,314,042; and 5,295,556. More specifically, U.S. Pat. No. 3,857,460 discloses a combination ladder and tool cart in which the cart portion and the ladder portion are separate and distinct structures. For purposes of economy and convenience, it would be desirable if a combination cart and ladder had a ladder portion that serves as both a ladder and a cart.

U.S. Pat. No. 5,082,086 discloses a wheeled ladder whose ladder portion is not extensible. To accommodate a wide variety of heights, it would be desirable if a combination cart and ladder had an extensible ladder portion.

U.S. Pat. No. 5,314,042 discloses a combination cart and ladder which is in the form of a tree stand and transport vehicle. The ladder is extensible, and the wheels are at a fixed location at one end of the ladder. When the ladder portion is used as a cart and a load is placed on the ladder portion, the load is pulled by a user. It is noted that pulling a load is facilitated if the composite center of gravity of the load and the combination cart and ladder is located near the cart wheels so that the load can be nearly balanced over the wheels. However, with the wheels being at a fixed location at one end of the ladder, it is difficult for the composite center of gravity of the load and the combination cart and ladder to be located near the cart wheels. In this respect, it would be desirable if a combination cart and ladder were provided with wheels that can be adjustably positioned along the length of the ladder portion so that the composite center of gravity of the load and the combination cart and ladder can be located near the cart wheels in order to nearly balance the load over the wheels.

U.S. Pat. No. 5,295,556 discloses a multipurpose hunting cart which includes a nonextensible ladder portion. In addition, this patent discloses a platform portion that is oriented with respect to the ladder portion at a fixed, obtuse orientation. As a result of this fixed, obtusely oriented platform, the platform portion constantly sticks out from the ladder portion. To avoid this result, it would be desirable if a combination cart and ladder were provided with a platform portion that does not constantly stick out from the ladder portion.

U.S. Pat. Nos. 4,991,690 and 5,080,193 may be of interest for their disclosure of hunters' ladders that are designed to be fixed to trees.

Still other features would be desirable in a ladder-based cart apparatus. As discussed above, when a combination cart and ladder is used as a cart, it would be desirable for the wheels to be adjustable so that a load could be nearly balanced over the wheels. However, when the combination cart and ladder is used as a ladder, it would be desirable if the wheels were not in contact with the ground at all. When wheels are in contact with the ground, but the wheels are not supposed to roll, the wheels must be supplied with brakes to prevent rolling. By avoiding contact of the wheels with the ground when the combination cart and ladder is used as a ladder, there is no need for brakes for the wheels.

When the combination cart and ladder is used to provide an elevated platform in a tree, it would be desirable for a way to be provided to secure the combination cart and ladder and the elevated platform to the tree. When the combination cart and ladder is used as a cart, it would be desirable for a handle to be provided for controlling the cart operation.

Thus, while the foregoing body of prior art indicates it to be well known to use combination carts and ladders, the prior art described above does not teach or suggest a ladder-based cart apparatus which has the following combination of desirable features: (1) has a ladder portion that serves as both a ladder and a cart; (2) has an extensible ladder portion; (3) provides wheel that can be adjustably positioned along the length of the ladder portion so that a composite center of gravity of a load and the combination cart and ladder can be located near the cart wheels in order to nearly balance the load over the wheels; (4) provides a platform portion that does not constantly stick out from the ladder portion; (5) provides wheels that can be adjusted so that they are not in contact with the ground at all when the device is in a ladder mode; (6) does not need wheel brakes; (7) provides a way to secure the combination cart and ladder and an elevated platform to a tree; and (8) provides a handle for controlling the cart operation. The foregoing desired characteristics are provided by the unique ladder-based cart apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a ladder-based cart apparatus which includes a first ladder assembly which includes a pair of first lateral support members and a plurality of first rungs connected between the first lateral support members. A second ladder assembly includes a pair of second lateral support members and a plurality of second rungs connected between the second lateral support members. A pair of wheel assemblies are supported by the first lateral support members at preselected positions along the first lateral support members. Connection assemblies connect the wheel assemblies to the preselected positions along the first lateral support members.

More specifically, the first rungs and the second rungs are hollow. Each of the pair of wheel assemblies includes a wheel unit. A respective fork assembly supports each wheel unit. Each fork assembly includes a fork-assembly-connector portion adapted to be received by a respective connection assembly for connecting the respective wheel assembly to the respective first lateral support member.

The connection assembly has a height which is less than respective widths of the first lateral support members so that translation of the second lateral support members with respect to the first lateral support members is not interfered with by the connection assembly.

A removable and replaceable rod is provided which fits through a hollow rung on the second ladder assembly. As mentioned above, the first lateral support members include feet assemblies connected to proximal ends of the first lateral support members.

A first platform assembly is connected to distal ends of the second lateral support members of the second ladder assembly. The first platform assembly includes a hinge assembly connected to the distal ends of the second lateral support members. A first platform element is connected to the hinge assembly. A stop element is connected to a bottom side of the first platform element. The stop element includes a fixed portion connected to the first platform element and a free-end portion projecting from the fixed portion at a predetermined obtuse angle.

A strap assembly is connected to the first platform element. The strap assembly includes a strap element which includes a first strap end, a midportion, and a second strap end. The strap assembly includes a first connector for connecting the first strap end to the first platform element and a second connector for connecting the second strap end to the first platform element.

A lock assembly is connected to each of the second lateral support members, for securing the respective free-end portion of the stop element into contact with a distal end of the one of the second lateral support members. Each lock assembly is connected to a bottom side of the one of the second lateral support members. Each lock assembly includes a plate element which projects outward from a distal end of one of the second lateral support members. The plate element includes an aperture positioned a predetermined distance from the distal end of the one of the second lateral support members. A locking rod adapted to be placed through the aperture.

In accordance with another embodiment of the invention, a second platform assembly is connected to the second lateral support members of the second ladder assembly. A pair of cable assemblies are connected between side portions of the second platform assembly and the second lateral support members for supporting the second platform assembly in a substantially horizontal orientation. A second platform hinge assembly is connected between the second platform assembly and the second lateral support members. The second platform hinge assembly provides for selective orientation of the second platform assembly with respect to the second lateral support members so that the second platform assembly can be folded to be substantially parallel to the second lateral support members when the second platform assembly is not in a horizontal orientation.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ladder-based cart apparatus which has all of the advantages of the prior art and none of the disadvantages.

It is another object of the present invention to provide a new and improved ladder-based cart apparatus which may be easily and efficiently manufactured and marketed.

It is a further object of the present invention to provide a new and improved ladder-based cart apparatus which is of durable and reliable construction.

An even further object of the present invention is to provide a new and improved ladder-based cart apparatus which is susceptible of a low cost of manufacture with regard to both materials and labor, and which accordingly is then susceptible of low prices of sale to the consuming public, thereby making such ladder-based cart apparatus available to the buying public.

Still yet a further object of the present invention is to provide a new and improved ladder-based cart apparatus which has a ladder portion that serves as both a ladder and a cart.

Still another object of the present invention is to provide a new and improved ladder-based cart apparatus that has an extensible ladder portion.

Yet another object of the present invention is to provide a new and improved ladder-based cart apparatus which provides wheel that can be adjustably positioned along the length of the ladder portion so that a composite center of gravity of a load and the combination cart and ladder can be located near the cart wheels in order to nearly balance the load over the wheels.

Even another object of the present invention is to provide a new and improved ladder-based cart apparatus that provides a platform portion that does not constantly stick out from the ladder portion.

Still a further object of the present invention is to provide a new and improved ladder-based cart apparatus which provides wheels that can be adjusted so that they are not in contact with the ground at all when the device is in a ladder mode.

Yet another object of the present invention is to provide a new and improved ladder-based cart apparatus that does not need wheel brakes.

Still another object of the present invention is to provide a new and improved ladder-based cart apparatus which provides a way to secure the combination cart and ladder and an elevated platform to a tree.

Yet another object of the present invention is to provide a new and improved ladder-based cart apparatus that provides a handle for controlling the cart operation.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the ladder-based cart apparatus of the invention attached to a tree.

FIG. 2 is a cross-sectional view of the embodiment of the ladder-based cart apparatus shown in FIG. 1 taken along line 2—2 of FIG. 1.

FIG. 3 is a cross-sectional view of the embodiment of the ladder-based cart apparatus of FIG. 2 taken along line 3—3 thereof.

FIG. 4 is an enlarged partial perspective view of a top portion of the embodiment of the invention shown in FIG. 1 not attached to a tree.

FIG. 5 is a side view of the portion of the embodiment of the invention shown in FIG. 4.

DESCRIPTION OF THE PREFERRED EMBODIMENT

Figure 6:
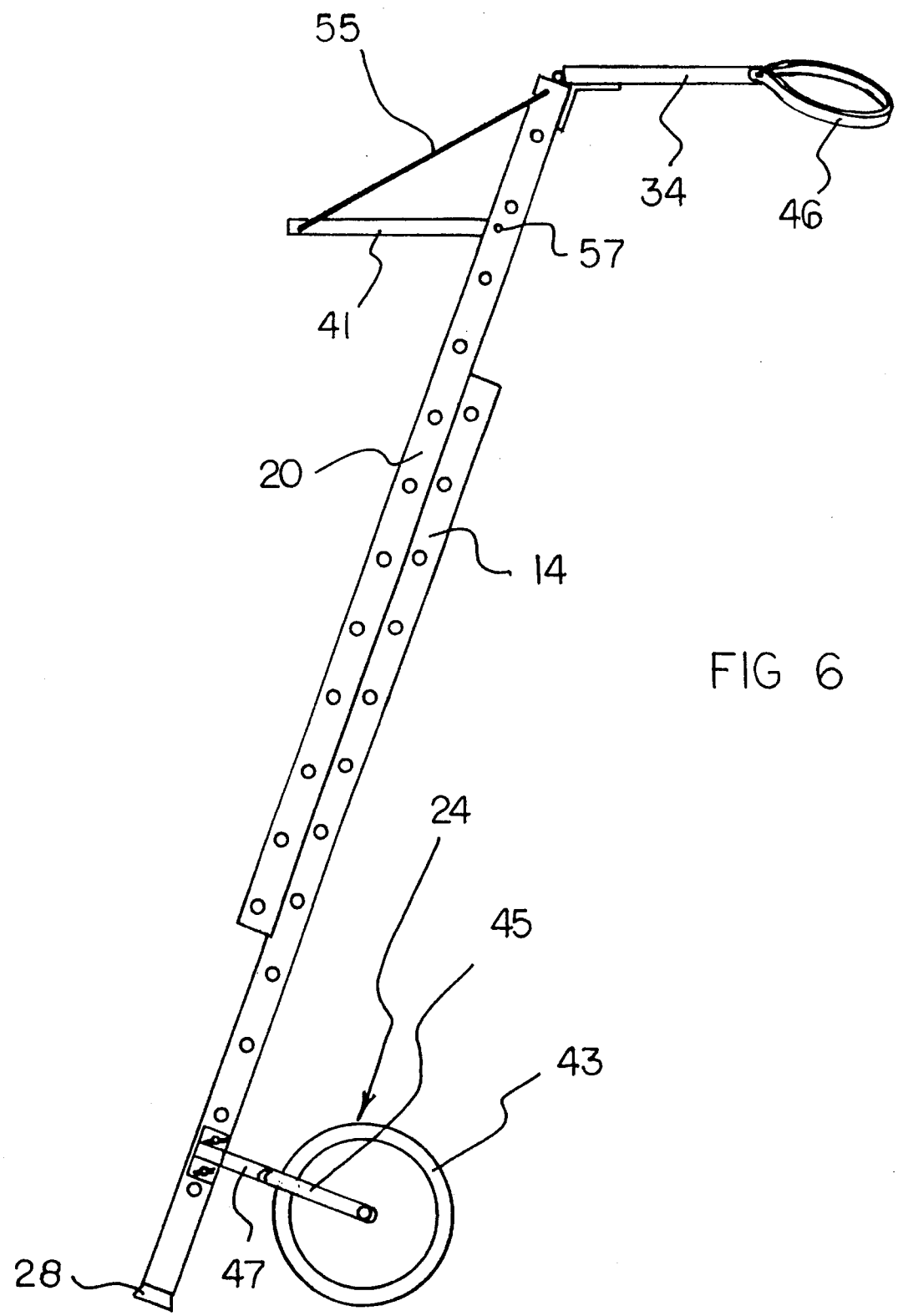
FIG. 6 is a perspective view of a second embodiment of the ladder-based cart apparatus of the invention which includes a second horizontal platform.

With reference to the drawings, a new and improved ladder-based cart apparatus embodying the principles and concepts of the present invention will be described.

Turning to FIGS. 1–5, there is show a first embodiment of the ladder-based cart apparatus of the invention generally designated by reference numeral 10. The ladder-based cart apparatus 10 includes a first ladder assembly 12 which includes a pair of first lateral support members 14 and a plurality of first rungs 16 connected between the first lateral support members 14. A second ladder assembly 18 includes a pair of second lateral support members 20 and a plurality of second rungs 22 connected between the second lateral support members 20. A pair of wheel assemblies 24 are supported by the first lateral support members 14 at preselected positions along the first lateral support members 14. Connection assemblies 26 connect the wheel assemblies 24 to the preselected positions along the first lateral support members 14.

The ladder-based cart apparatus of the invention can be used as a ladder such as shown in FIG. 1 where the ladder-based cart apparatus 10 is leaning up against a tree 11. When the ladder-based cart apparatus of the invention is used in this manner, the pair of wheel assemblies 24 are generally located a sufficient distance above the feet assemblies 28 so that the pair of wheel assemblies 24 do not interfere with the support of the ladder by the feet assemblies 28. This feature is shown clearly in FIG. 6.

In addition, a first platform assembly 30 is provided that enables a person to be seated (or stand) at the top of the ladder. Alternatively, the ladder-based cart apparatus of the invention can be used in a substantially horizontal orientation so that the pair of wheel assemblies 24 support one end of the ladder-based cart apparatus. In this mode of use, the ladder-based cart apparatus of the invention can be used as a wheeled cart for transporting items, especially game such as deer, that are killed during hunting.

More specifically, the first rungs 16 and the second rungs 22 are hollow. Each of the pair of wheel assemblies 24 includes a wheel unit 43. A respective fork assembly 45 supports each wheel unit 43. Each fork assembly 45 includes a fork-assembly-connector portion 47 adapted to be received by a respective connection assembly 26 for connecting the respective wheel assembly 24 to the respective first lateral support member 14.

Each connection assembly 26, for each first lateral support member 14, can include a U-shaped bracket 49 which has a sufficient internal width for bracketing a respective first lateral support member 14. A receiver portion 51 is connected to the U-shaped bracket 49. The receiver portion 51 is adapted to receive the fork-assembly-connector portion 47 of a respective wheel assembly 24 for retaining the wheel assembly 24. A pair of screw clamps 53 are connected to one side of each U-shaped bracket 49. When the screw clamps 53 are loosened, the connection assemblies 26 can be slid along the first lateral support members 14 to any desired locations. Then, the screw clamps 53 are retightened to secure the screw clamps 53 to the first lateral support members 14 at the desired positions. The height of the U-shaped bracket 49 is less than the width of the associated first lateral support member 14 so that the U-shaped bracket 49 does not project above the first lateral support member 14 and interfere with translation of the second lateral support members 20 with respect to the first lateral support members 14.

Moreover, as shown in FIG. 6, when the ladder-based cart apparatus 10 of the invention is used as a ladder, the pair of wheel assemblies 24 are preferably positioned along the first lateral support members 14 so that the pair of wheel assemblies 24 are above the feet assemblies 28 and do not prevent the feet assemblies 28 from adequately supporting the ladder-based cart apparatus 10 of the invention.

Generally speaking, the connection assembly 26 has a height which is less than respective widths of the first lateral support members 14 so that translation of the second lateral support members 20 with respect to the first lateral support members 14 is not interfered with by the connection assembly 26.

As shown in FIGS. 1 and 4, removable and replaceable rod 68 is provided which fits through a hollow rung on the second ladder assembly 18. The rod 68 serves as a handle for the ladder-based cart apparatus 10. As mentioned above, the first lateral support members 14 include feet assemblies 28 connected to proximal ends of the first lateral support members 14.

A first platform assembly 30 is connected to distal ends of the second lateral support members 20 of the second ladder assembly 18. The first platform assembly 30 includes a hinge assembly 32 connected to the distal ends of the second lateral support members 20. A first platform element 34 is connected to the hinge assembly 32. A stop element 36 is connected to a bottom side of the first platform element 34. The stop element 36 includes a fixed portion 38 connected to the first platform element 34 and a free-end portion 40 projecting from the fixed portion 38 at a predetermined obtuse angle 42.

A strap assembly is connected to the first platform element 34. The strap assembly includes a strap element 46 which includes a first strap end 48, a midportion 50, and a second strap end 52. The strap assembly includes a first connector 54 for connecting the first strap end 48 to the first platform element 34 and a second connector 56 for connecting the second strap end 52 to the first platform element 34.

A lock assembly 60 is connected to each of the second lateral support members 20, for securing the respective free-end portion 40 of the stop element 36 into contact with a distal end of the one of the second lateral support members 20. Each lock assembly 60 is connected to a bottom side of the one of the second lateral support members 20. Each lock assembly 60 includes a plate element 62 which projects outward from a distal end of one of the second lateral support members 20. The plate element 62 includes an aperture 64 positioned a predetermined distance from the distal end of the one of the second lateral support members 20. A locking rod 66 adapted to be placed through the aperture 64.

In operation of the lock assembly 60, when the first platform element 34 is swung around the hinge assembly 32, the free-end portion 40 of the stop element 36 rests upon a distal end of a second lateral support member 20. The free-end portion 40 has a thickness that substantially equals the predetermined distance that the aperture 64 is from the distal end of the second lateral support member 20. Then, the locking rod 66 is inserted through the aperture 64. Once this is done, the free-end portion 40 of the stop element 36 is locked under the locking rod 66, and the first platform element 34 is prevented from rotating around the hinge assembly 32. In this way, the first platform element 34 is locked at the predetermined obtuse angle 42 with respect to the second lateral support members 20.

Referring again to FIG. 6, a second embodiment of the invention is shown. Reference numerals are shown that correspond to like reference numerals that designate like elements shown in the other figures. In addition, a second platform assembly 41 is connected to the second lateral support members 20 of the second ladder assembly 18. A pair of cable assemblies 55 are connected between side portions of the second platform assembly 41 and the second lateral support members 20 for supporting the second platform assembly 41 in a substantially horizontal orientation. A second platform hinge assembly 57 is connected between the second platform assembly 41 and the second lateral support members 20. The second platform hinge assembly 57 provides for selective orientation of the second platform assembly 41 with respect to the second lateral support members 20 so that the second platform assembly 41 can be folded to be substantially parallel to the second lateral support members 20 when the second platform assembly 41 is not in a horizontal orientation. When the second platform assembly 41 is in a horizontal orientation, supported by the cable assemblies 55, a person can sit or stand on the second platform assembly 41.

The components of the ladder-based cart apparatus of the invention can be made from inexpensive and durable metal and plastic materials or wooden materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved ladder-based cart apparatus that is low in cost, relatively simple in design and operation, and which may advantageously be used to provide a ladder portion that serves as both a ladder and a cart. With the invention, a ladder-based cart apparatus is provided which has an extensible ladder portion. With the invention, a ladder-based cart apparatus provides wheel that can be adjustably positioned along the length of the ladder portion so that a composite center of gravity of a load and the combination cart and ladder can be located near the cart wheels in order to nearly balance the load over the wheels. With the invention, a ladder-based cart apparatus provides a platform portion that does not constantly stick out from the ladder portion. With the invention, a ladder-based cart apparatus provides wheels that can be adjusted so that they are not in contact with the ground at all when the device is in a ladder mode. With the invention, a ladder-based cart apparatus is provided which does not need wheel brakes. With the invention, a ladder-based cart apparatus provides a way to secure the combination cart and ladder and an elevated platform to a tree. With the invention, a ladder-based cart apparatus provides a handle for controlling the cart operation.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A ladder-based cart apparatus, comprising:

a first ladder assembly which includes a pair of first lateral support members and a plurality of first rungs connected between said first lateral support members, a second ladder assembly which includes a pair of second lateral support members and a plurality of second rungs connected between said second lateral support members, a pair of wheel assemblies supported by said first lateral support members at preselected positions along said first lateral support members, and connection assembly means for connecting said wheel assemblies to said preselected positions along said first lateral support members, such that said wheel assemblies are located below both said first ladder assembly and said second ladder assembly, wherein said connection assembly means has a height which is less than respective widths of said first lateral support members so that translation of said second lateral support members with respect to said first lateral support members is not interfered with by said connection assembly means.

2. The apparatus of claim 1 wherein said first rungs and said second rungs are hollow.

3. The apparatus of claim 2, further including:

a removable and replaceable rod which fits through a hollow rung on said second ladder assembly.

4. The apparatus of claim 1 wherein each of said pair of wheel assemblies includes:

a wheel unit, and a fork assembly supporting said wheel unit, wherein said fork assembly includes a fork-assembly-connector portion adapted to be received by said connection assembly means for connecting said pair of wheel assemblies to said first lateral support members.

5. The apparatus of claim 1 wherein said first lateral support members include feet assemblies connected to proximal ends of said first lateral support members.

6. The apparatus of claim 1, further including:

a first platform assembly connected to distal ends of said second lateral support members of said second ladder assembly.

7. The apparatus of claim 6, further including:

a second platform assembly connected to said second lateral support members of said second ladder assembly, a pair of cable assemblies connected between side portions of said second platform assembly and said second lateral support members for supporting said second platform assembly in a substantially horizontal orientation, and a second platform hinge assembly connected between said second platform assembly and said second lateral support members, wherein said second platform hinge assembly provides for selective orientation of said second platform assembly with respect to said second lateral support members so that said second platform assembly can be folded to be substantially parallel to said second lateral support members when said second platform assembly is not in a horizontal orientation.

8. A ladder-based cart apparatus, comprising:

a first ladder assembly which includes a pair of first lateral support members and a plurality of first rungs connected between said first lateral support members, a second ladder assembly which includes a pair of second lateral support members and a plurality of second rungs connected between said second lateral support members, a pair of wheel assemblies supported by said first lateral support members at preselected positions along said first lateral support members, and connection assembly means for connecting said wheel assemblies to said preselected positions along said first lateral support members, such that said wheel assemblies are located below both said first ladder assembly and said second ladder assembly, wherein said connection assembly means has a height which is less than respective widths of said first lateral support members so that translation of said second lateral support members with respect to said first lateral support members is not interfered with by said connection assembly means, further including a first platform assembly connected to distal ends of said second lateral support members of said second ladder assembly, wherein said first platform assembly includes a hinge assembly connected to said distal ends of said second lateral support members, a first platform element connected to said hinge assembly, a stop element connected to a bottom side of said first platform element, wherein said stop element includes a fixed portion connected to said first platform element and a free-end portion projecting from said fixed portion at a predetermined obtuse angle, and a strap assembly connected to said first platform element, wherein said strap assembly includes a strap element which includes a first strap end, a midportion, and a second strap end, and wherein said strap assembly includes a first connector for connecting said first strap end to said first platform element and a second connector for connecting said second strap end to said first platform element, further including a lock assembly, connected to one of said second lateral support members, for securing said free-end portion of said stop element into contact with a distal end of said one of said second lateral support members, wherein said lock assembly is connected to a bottom side of said one of said second lateral support members, wherein said lock assembly includes a plate element which projects outward from a distal end of one of said second lateral support members, wherein said plate element includes an aperture positioned a predetermined distance from said distal end of said one of said second lateral support members, and a locking rod adapted to be placed through said aperture.

* * * * *